United States Patent
Elie et al.

(10) Patent No.: US 9,856,688 B2
(45) Date of Patent: Jan. 2, 2018

(54) BI-DIRECTIONAL ELEMENT DRIVE SYSTEM

(71) Applicant: FORD GLOBAL TECHNOLOGIES, LLC, Dearborn, MI (US)

(72) Inventors: Larry Dean Elie, Ypsilanti, MI (US); John W. Jaranson, Dearborn, MI (US); Timothy J. Potter, Dearborn, MI (US); Robert F. Novak, Farmington Hills, MI (US); Michael M. Azzouz, Livonia, MI (US); Gerald J. Heath, Allen Park, MI (US); Jeff A. Wallace, Walled Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/534,654

(22) Filed: Nov. 6, 2014

(65) Prior Publication Data

US 2016/0129768 A1    May 12, 2016

(51) Int. Cl.
E05F 15/627 (2015.01)
F16H 19/06 (2006.01)
E05F 15/616 (2015.01)

(52) U.S. Cl.
CPC .......... *E05F 15/627* (2015.01); *E05F 15/616* (2015.01); *F16H 19/06* (2013.01); *E05Y 2900/531* (2013.01); *F16H 2019/0668* (2013.01); *F16H 2019/0695* (2013.01)

(58) Field of Classification Search
CPC ....... B60J 5/047; E05F 15/616; E05F 15/619; E05F 15/627

USPC .... 49/339, 340, 358, 352; 296/146.4, 50, 56
See application file for complete search history.

(56) References Cited

U.S. PATENT DOCUMENTS

| | | | | |
|---|---|---|---|---|
| 1,326,286 A | * | 12/1919 | Perkins | F16H 19/06 49/358 |
| 3,988,860 A | * | 11/1976 | Nevarez | E05F 15/627 49/327 |
| 4,167,833 A | * | 9/1979 | Farina | E05F 15/77 49/199 |
| 4,617,757 A | | 10/1986 | Kaglyama et al. | |
| 4,819,377 A | * | 4/1989 | Bauer | E05F 11/382 49/221 |
| 4,823,512 A | * | 4/1989 | Maekawa | E05F 11/485 49/352 |
| 4,829,711 A | * | 5/1989 | Sambor | E05F 11/486 49/211 |
| 5,398,988 A | * | 3/1995 | DeRees | B60J 5/0479 296/155 |
| 5,528,861 A | * | 6/1996 | Beyerlein | E05F 11/485 49/349 |
| 5,737,875 A | | 4/1998 | Dowling et al. | |
| 5,833,301 A | | 11/1998 | Watanabe et al. | |

(Continued)

*Primary Examiner* — Katherine Mitchell
*Assistant Examiner* — Marcus Menezes
(74) *Attorney, Agent, or Firm* — Jason Rogers; King & Schickli, PLLC

(57) ABSTRACT

A bi-directional element drive system includes a motor having a drive shaft, a cable anchor and a cable connector. The cable connector is carried on the drive shaft and has two ends connected to the cable anchor. In addition the drive system includes a support and a driven element. The driven element is displaced between a first position and a second position relative to the support by the motor.

11 Claims, 8 Drawing Sheets

(56) References Cited

U.S. PATENT DOCUMENTS

| | | | | |
|---|---|---|---|---|
| 6,193,621 | B1* | 2/2001 | McClosky | F16C 1/22 |
| | | | | 474/101 |
| 6,658,793 | B2* | 12/2003 | Perron | E05F 11/04 |
| | | | | 49/123 |
| 6,918,210 | B1* | 7/2005 | Smiley | E05F 15/643 |
| | | | | 49/347 |
| 7,520,028 | B2* | 4/2009 | Borleis | E05D 3/122 |
| | | | | 16/354 |
| 7,600,345 | B2* | 10/2009 | Slopack | E05B 17/0029 |
| | | | | 49/25 |
| 7,866,732 | B2* | 1/2011 | Oxley | C03B 37/01208 |
| | | | | 296/146.4 |
| 8,365,359 | B2* | 2/2013 | Morishita | 16/354 |
| 8,690,225 | B2* | 4/2014 | Ginn | E05F 15/643 |
| | | | | 296/146.4 |
| 9,676,256 | B2* | 6/2017 | Elie | B60J 5/00 |
| 2004/0065018 | A1* | 4/2004 | Regnier | E05F 11/485 |
| | | | | 49/352 |
| 2005/0229493 | A1* | 10/2005 | Ootsuki | E05F 15/689 |
| | | | | 49/352 |
| 2007/0084016 | A1* | 4/2007 | Bommelmann | E05D 3/122 |
| | | | | 16/366 |
| 2013/0014442 | A1* | 1/2013 | Ginn | E05F 15/643 |
| | | | | 49/349 |
| 2017/0023106 | A1* | 1/2017 | Elie | F16C 1/223 |

* cited by examiner

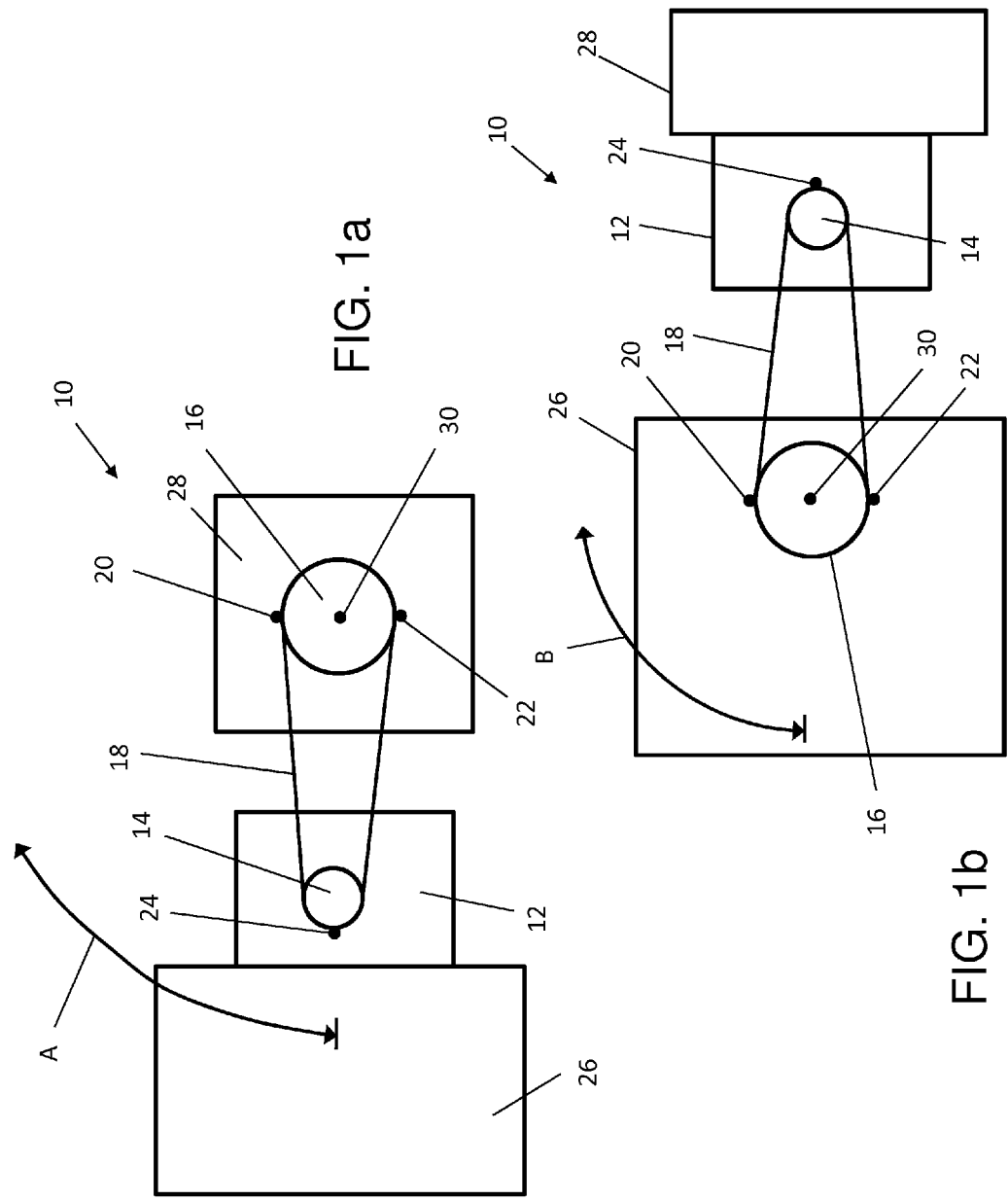

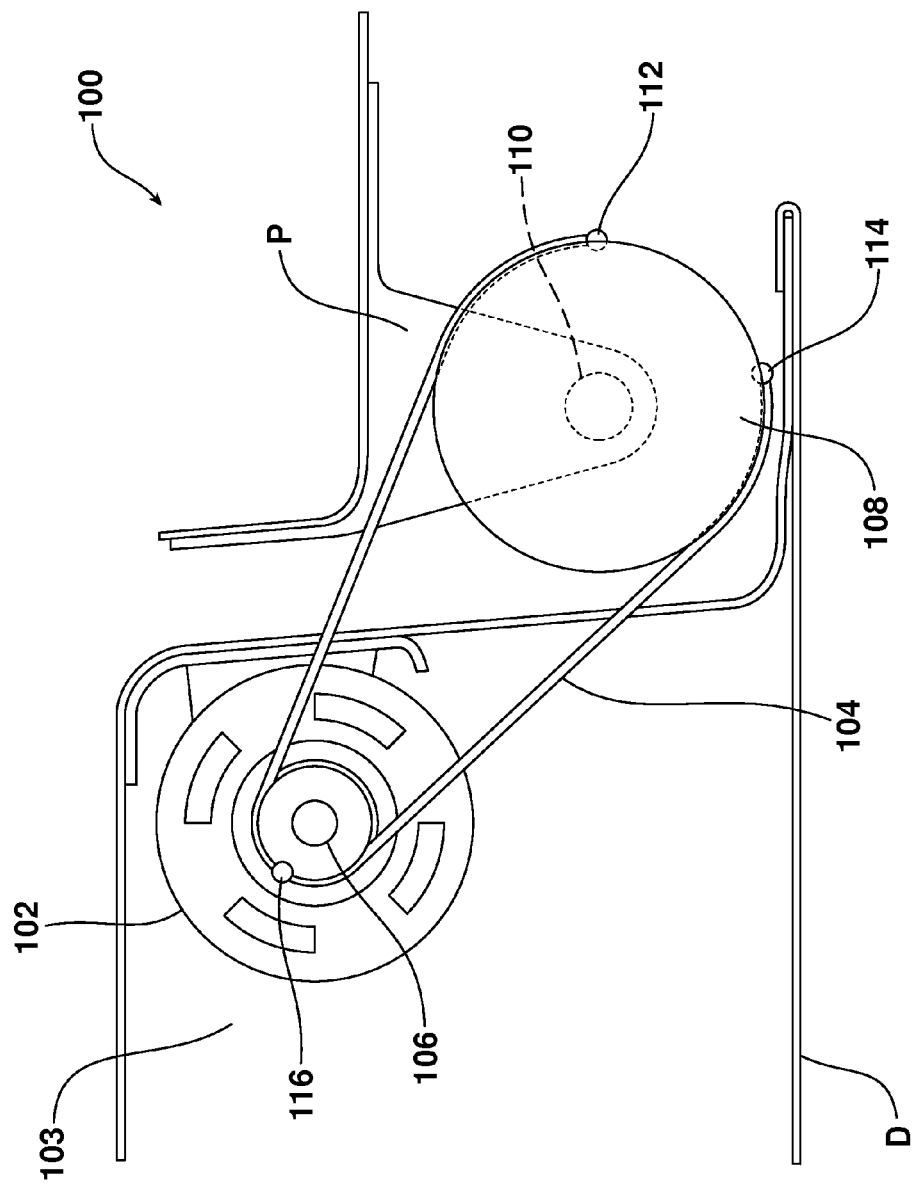

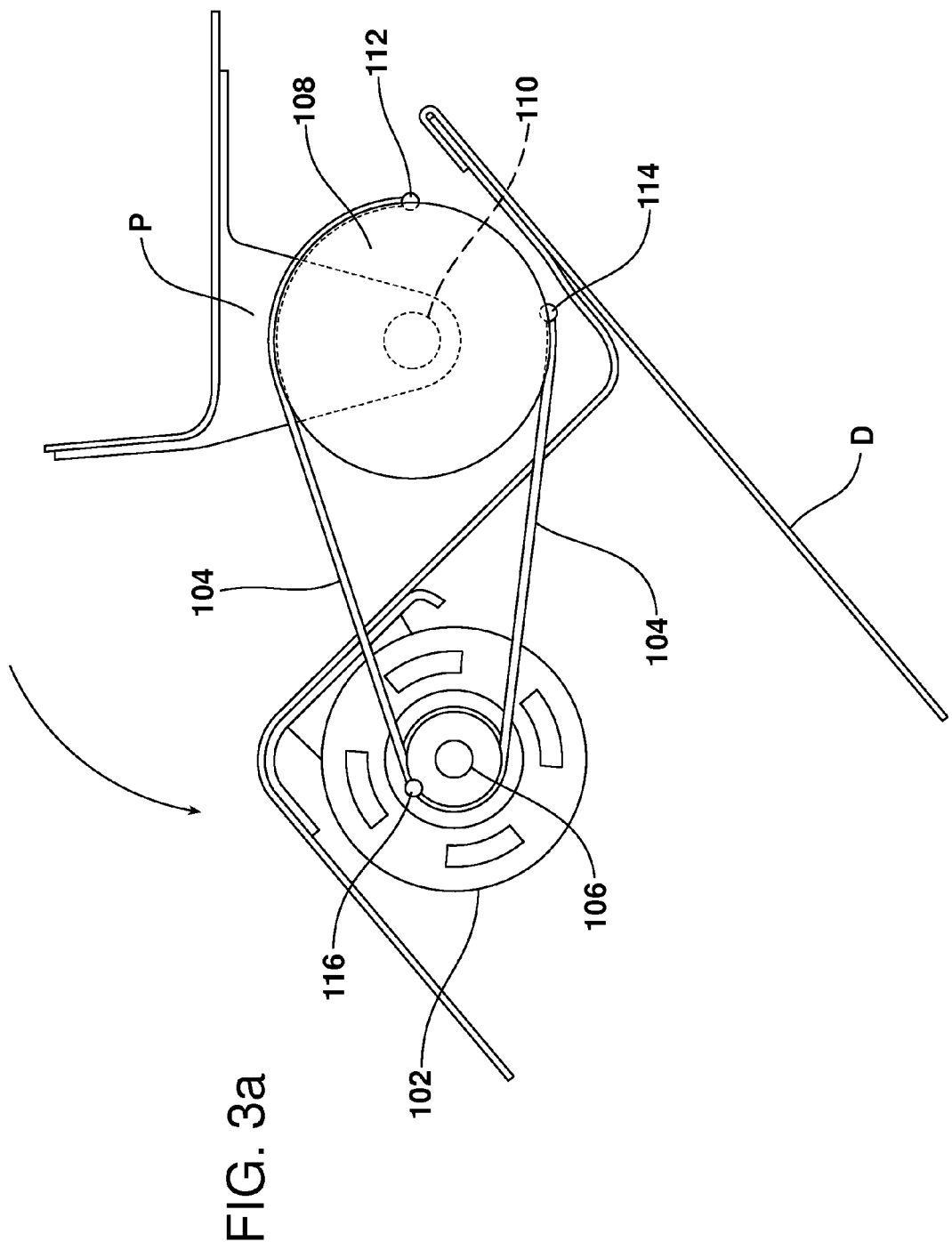

BI-DIRECTIONAL ELEMENT DRIVE SYSTEM

TECHNICAL FIELD

This document relates generally to a simple and inexpensive bi-directional element drive system of compact design that is useful as an actuator for doors, gates, lock latches, arms, levers, seats, aircraft control surfaces and the like.

BACKGROUND

Compact actuation is required for many devices including, for example, automobiles and other motor vehicles. In addition to being compact, the actuators need to be reliable for a long service life as they are typically mounted in locations that do not have easy direct service access. In addition to space limitations, hysteresis in the drive system may be a limiting consideration. For a gear-driven system, removing play is costly.

Further, some systems require quick response. A particularly difficult application is the damping and control of a vehicle door. A large force must be absorbed in a very short distance and smaller forces must be maintained for extended duration. Play is unacceptable, even with a long moment arm at the door. In addition, the actuator must fit in premium real estate in either the door or the pillar, retaining direct mechanical access to the other element. Still further, the electronic control must have the ability to absorb substantial energy at the ends of door movement when the door is closed and latched and the door is fully open.

This document relates to an actuator or bi-directional element drive system made from an inexpensive electric motor that delivers excellent rotary or linear control without a traditional transmission of any type. The system also has low or essentially no hysteresis. Advantageously, only a small motor is necessary for high force applications. Further in the off state, the system can be designed to be overcome by human effort thereby allowing the opening and closing of the door even in the event of a power failure in the vehicle.

SUMMARY

In accordance with the purposes and benefits described herein, a bi-directional element drive system is provided. That drive system may be broadly described as comprising a motor including (a) a drive shaft, (b) a cable anchor, (c) a cable connection carried on the drive shaft and having two ends connected to the cable anchor, (d) a support and (e) a driven element. The driven element is displaced between a first position and a second position relative to the support by the motor.

In one possible embodiment, the motor is fixed to the support and the cable anchor is fixed to the driven element. In another possible embodiment, the motor is fixed to the driven element and the cable anchor is fixed to the support.

In one possible embodiment, the cable connector is also fixed to the drive shaft. In one possible embodiment, the cable connector is a single cable. In another possible embodiment, the cable connector is two cables.

In one possible embodiment, the driven element pivots between the first position and the second position about a pivot axis. In one possible embodiment, the cable anchor is a fixed pulley. In one possible embodiment, the fixed pulley is centered on the pivot axis.

In one possible embodiment, the cable anchor is arc-like. In one possible embodiment, the driven element is selected from a group of structures consisting of a gate, a door, an arm, a lock latch and a lever.

In one possible embodiment the driven element slides between the first position and the second position. In that embodiment the driven element is selected from a group of structures consisting of a gate, a door, a lock latch, a seat and a control surface of an aircraft.

In one possible embodiment the cable connector also includes a spring to eliminate play.

In accordance with an additional aspect, a door system is provided for a motor vehicle. The door system comprises a motor including (a) a drive shaft, (b) a cable anchor and (c) a cable connector. The cable connector is carried on the drive shaft and has two ends connected to the cable anchor. In addition an anchor point is provided on a body of the motor vehicle. Further, a door is received in a door opening on the body of the motor vehicle. The door is displaced between an open position and a closed position by the motor.

In one possible embodiment of the door system, the motor is fixed to the anchor point and the cable anchor is fixed to the door. In another possible embodiment of the door system, the motor is fixed to the door and the cable anchor is fixed to the anchor point.

In yet another embodiment, the door pivots about a pivot axis between the open position and the closed position and the cable anchor is centered on that pivot axis. In one possible embodiment, the cable anchor is a fixed pulley and the anchor point is a door pillar of the vehicle.

In accordance with an additional aspect, a method is provided of driving an element between a first position and a second position relative to a support. The method may be broadly described as comprising the steps of: (a) fixing a motor to one of the element and the support, (b) fixing a cable anchor to the other of the element and the support, (c) connecting two ends of a cable connector carried on a drive shaft of the motor to the cable support, and (d) driving the motor in a first direction to move the element from the first position to the second position and then a second direction to move the element from the second position to the first position.

In the following description, there are shown and described several preferred embodiments of the bi-directional element drive system, the door system and the related method. As it should be realized, the systems and method are capable of other, different embodiments and their several details are capable of modification in various, obvious aspects all without departing from the systems and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the drive system and together with the description serve to explain certain principles thereof. In the drawing figures:

FIG. 1a is a schematic block diagram of a first embodiment of the bi-directional element drive system.

FIG. 1b is a schematic block diagram of a second embodiment of the bi-directional element drive system.

FIG. 2a is a schematic top plan view of a door system for a motor vehicle wherein a motor is mounted to a door which pivots on a fixed axis and the cable anchor is fixed to a pillar and centered on that fixed axis. The door is illustrated in the closed position.

FIG. 2b is a side elevational view of the motor, cable anchor and cable connector illustrated in FIG. 2a.

FIG. 3a is a schematic top plan view of the door system illustrating the door open to an arc of about 40°.

Figure 1C:
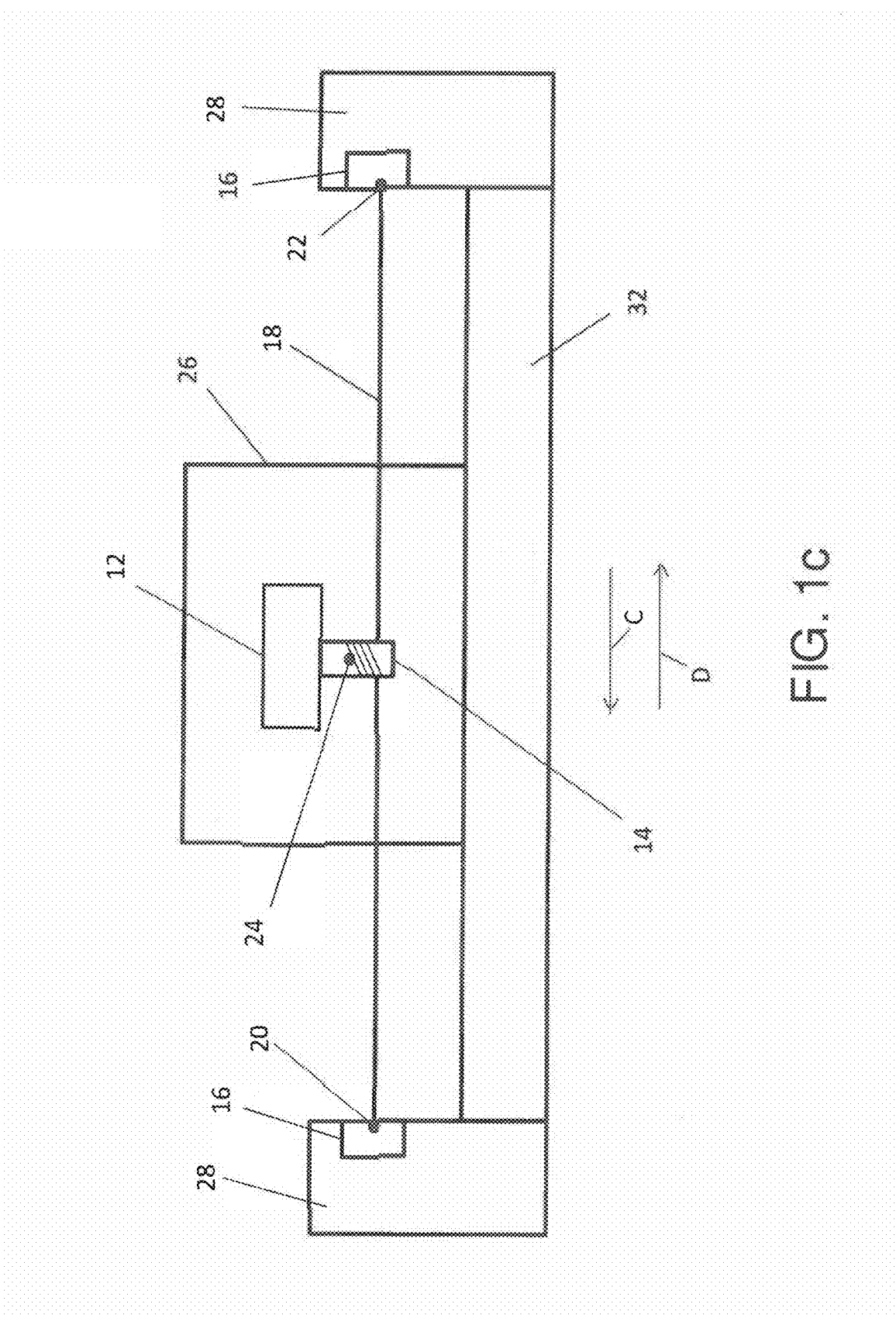
FIG. 1c is a schematic block diagram of a third embodiment of the bi-directional element drive system.

Reference will now be made in detail to the present preferred embodiments of the bi-directional element drive system and door system, examples of which are illustrated in the accompanying drawing figures.

DETAILED DESCRIPTION

Reference is now made to FIG. 1a which broadly illustrates a first embodiment of a bi-directional element drive system 10. That system 10 includes a motor 12, including a drive shaft 14, a cable anchor 16 and a cable connector 18. The cable connector 18 is carried on the drive shaft 14 and has two ends 20, 22 connected to the cable anchor 16.

In one possible embodiment, the cable connector 18 comprises a low stretch cable having multiple turns wrapped around a grooved or threaded section of the drive shaft 14. At one point 24 the cable connector 18 is permanently anchored or staked to the drive shaft 14 to eliminate any possibility of the cable slipping on the drive shaft. In one embodiment, the cable connector 18 comprises a single cable having a first end 20 pinned at a first point to the cable anchor 16, a second end 22 pinned at a second point to the cable anchor and a midpoint pinned at the point 24 to the drive shaft 14. In another possible embodiment, the cable connector 18 comprises two separate cables: one extending from the pin point 24 to the end 20 and the other extending from the pin point 24 to the end 22. Where two cables are provided for the cable connector 18, both cables are wrapped multiple turns around the drive shaft 14 between the pin point 24 and the individual ends 20, 22.

In the embodiment illustrated in FIG. 1a, the motor 12 is connected to and carried on the driven element 26 while the cable anchor 16 is connected to or carried on the stationary support 28. In one possible embodiment, the cable anchor 16 is an arc-like element. In another possible embodiment the cable anchor 16 is a fixed pulley. The cable anchor/fixed pulley 16 is centered on a pivot axis 30. The driven element 26 pivots about the axis 30 along an arc illustrated by action arrow A between the illustrated first or closed position and a second or open position.

Reference is now made to FIG. 1b illustrating a second embodiment of the bi-directional element drive system 10. In this embodiment the motor 12 is carried on the fixed support 28 and the cable anchor 16 is carried on the driven element 26. The cable connector 18 is connected between the drive shaft 14 of the motor 12 and the cable anchor 16 in the same manner as described above with respect to the embodiment illustrated in FIG. 1a with like reference numbers indicating the attachment points.

As should be appreciated, in the FIG. 1b embodiment, the cable anchor 16, fixed to the driven element 26, is centered on the pivot axis 30 so that when the motor 12 is driven in a clockwise direction, the driven element 26 moves along an arc B in the clockwise direction. In contrast, when the motor 12 is driven in a counterclockwise direction, the driven element 26 moves along the arc B in a counterclockwise direction about the axis 30.

Reference is now made to FIG. 1c illustrating yet another embodiment of the bi-directional element drive system 10. In this embodiment, the motor 12 is carried on the driven element 26 which translates along a track 32. The cable connector 18 extends from the drive shaft 14 of the motor 12 to a split cable anchor 16 carried on a stationary support 28 at each end of the track 32. As illustrated, the ends 20, 22 of the cable connector 18 are secured to opposing portions of the cable anchor 16 at opposite ends of the track 32 while a midpoint of the cable connector is fixed to the drive shaft 14 of the pin 24. When the motor 12 is driven in a first direction, the driven element 26 moves along the track 32 in the direction of action arrow C. In contrast, when the motor 12 is driven in the opposite direction, the driven element 26 moves along the track 32 in the direction of action arrow D.

Figure 2:
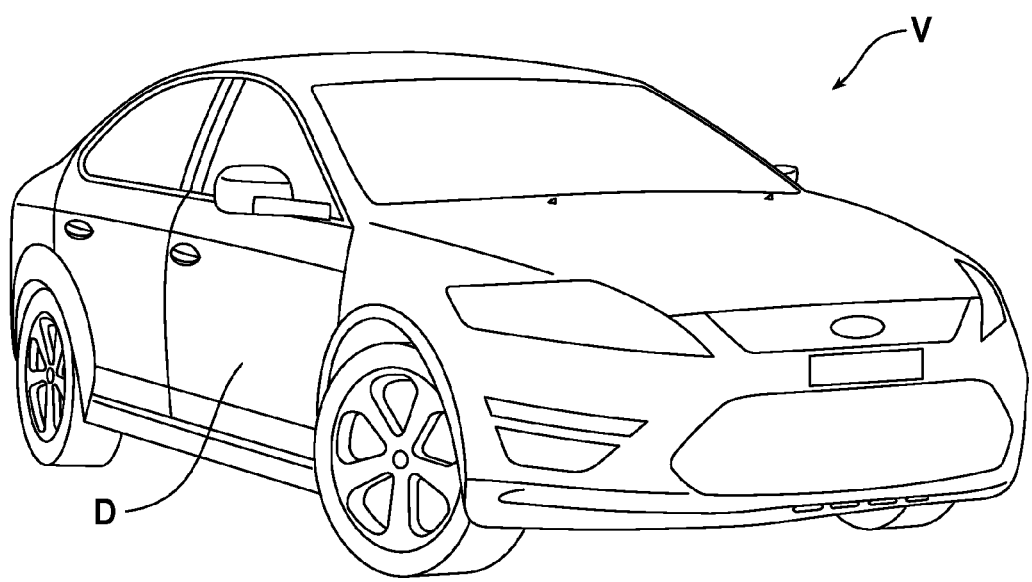
FIG. 2 is a perspective view of a vehicle illustrated with a side door in the closed position.
Figure 2B:
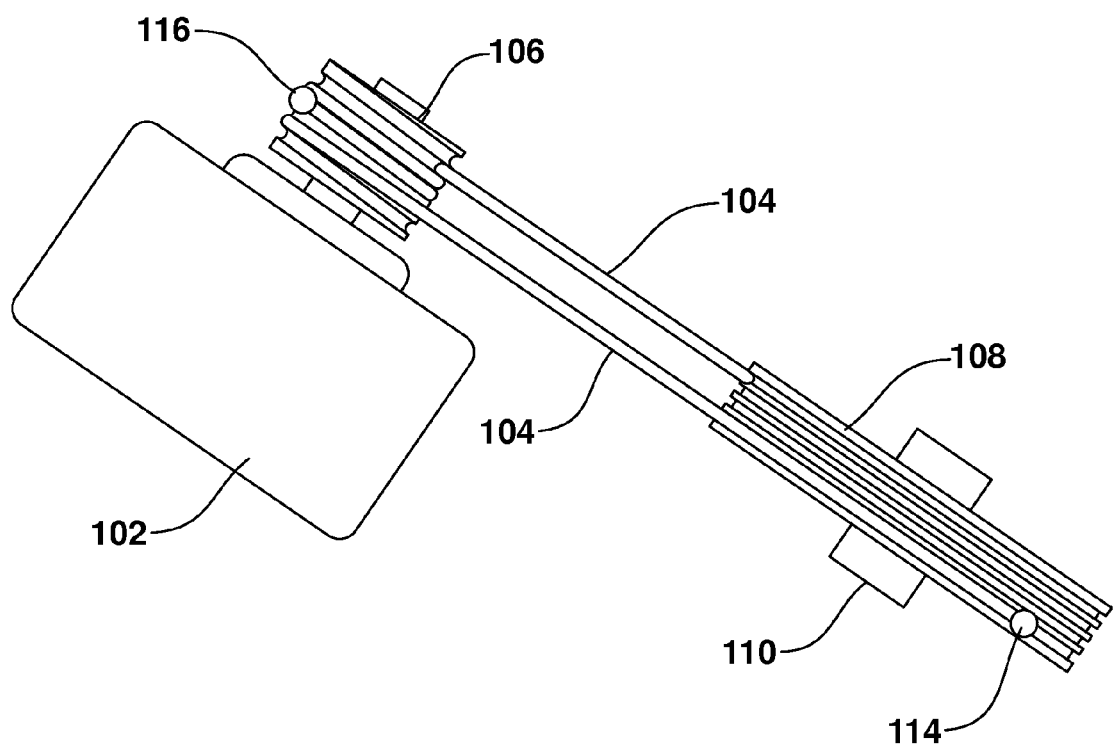

FIGS. 2, 2a, 2b, 3 and 3a illustrate a door actuator system 100 for a motor vehicle. More specifically, FIG. 2 illustrates a vehicle V including a door D in a closed position. As illustrated in FIGS. 2a and 2b, the door actuator system 100 includes a motor 102 mounted to the door D and held within the internal compartment 103 of that door. A cable connector 104 connects the drive shaft 106 of the motor 102 to the cable anchor 108. In the illustrated embodiment, the cable anchor 108 is an arc-like element in the form of a pulley that is fixed to the pillar P of the vehicle V. The cable anchor/fixed pulley 108 is centered on the hinge point/pivot axis 110 of the door D. The cable connector 104 has a first end fixed to the cable anchor/pulley 108 at the point 112 and a second end fixed to the cable anchor/pulley at the point 114. The cable connector 104 is wrapped around the drive shaft 106 a number of times and is pinned at an intermediate point 116 to the drive shaft.

Figure 3:
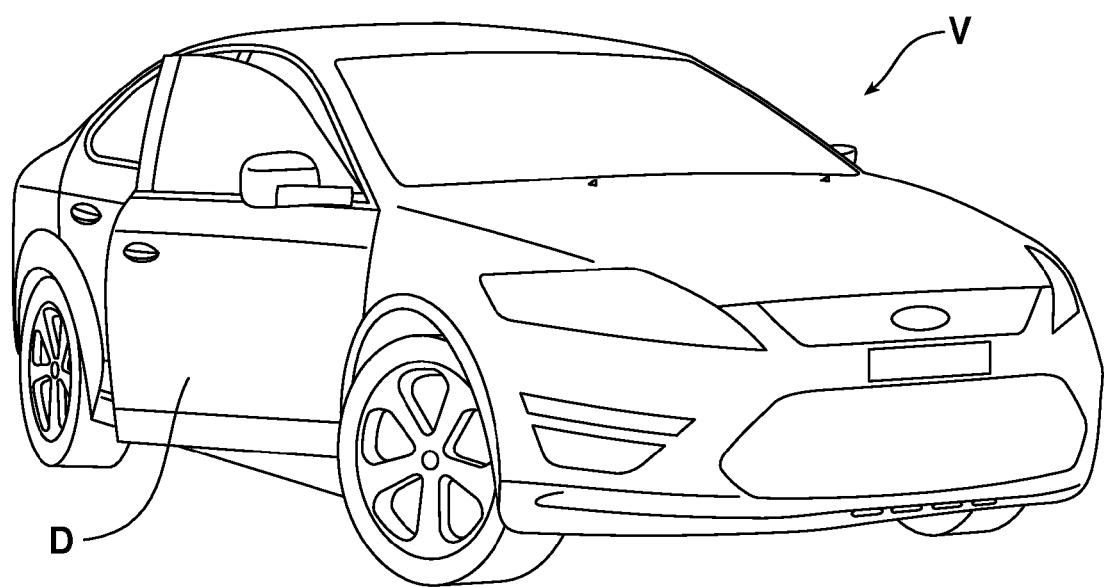
FIG. 3 is a view similar to FIG. 2 with the vehicle door now open to an arc of about 40°.

The door D is opened by activating the motor 102. More specifically, motor 102 may be driven clockwise through an arc of approximately 40° to swing the door D open approximately 40° as illustrated in FIGS. 3 and 3a. Various types of small electric motors 102 may be utilized for this purpose including, for example, a stepper motor, a smart motor, an AC motor, a DC motor, a permanent magnet motor, a brushed motor, a brushless motor, a switched reluctance motor, a shunt wound motor, a series wound motor, a compound motor, an induction motor, a universal motor, a servo motor, a piezo motor and a hydraulic motor.

Figure 4:
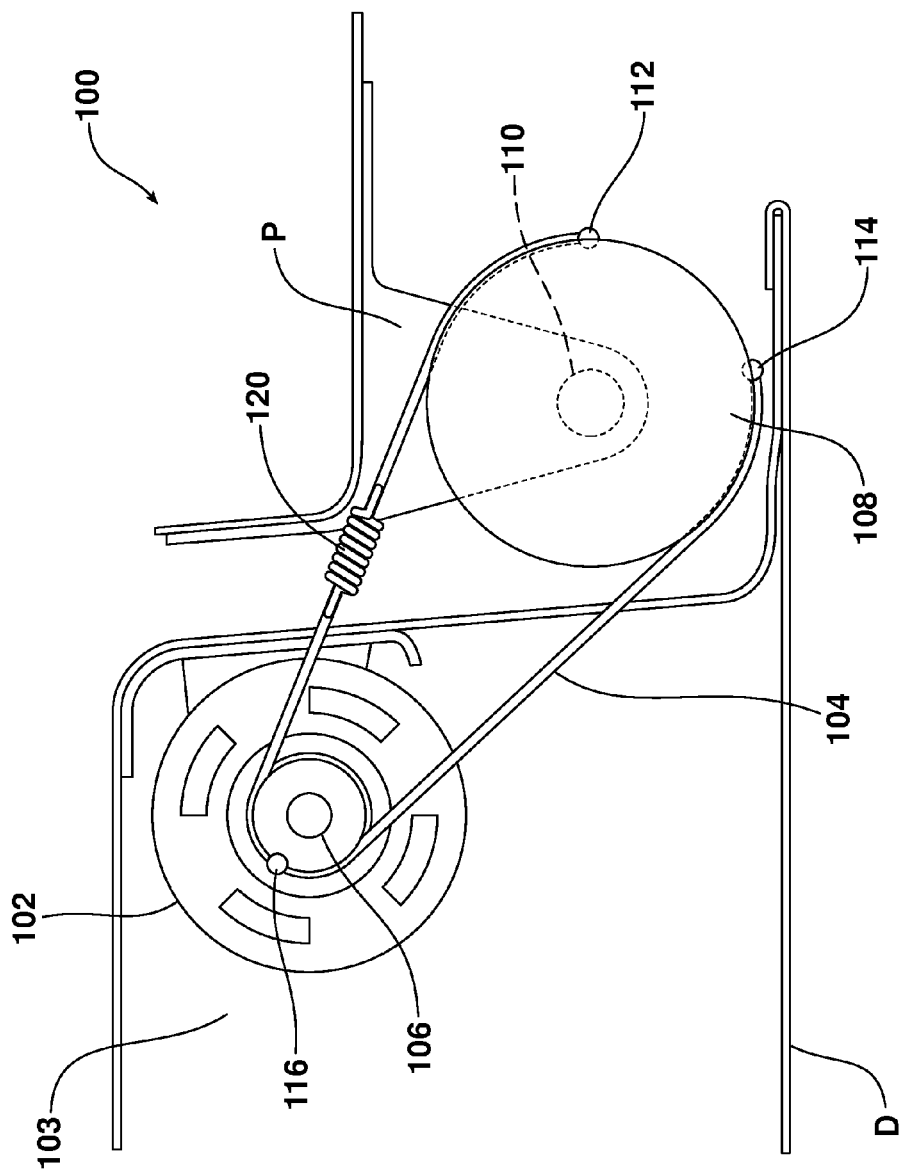
FIG. 4 is an alternative embodiment of a door system incorporating a spring in the cable connector to help eliminate play from the system.

Reference is now made to FIG. 4 illustrating yet another alternative embodiment of drive system 100. In this drive system 100, the cable connector 104 incorporates a large force spring 120 which functions to remove any play in the system including any stretch that might ultimately occur in the cable connector 104 over time. Otherwise, the structure of the FIG. 4 embodiment corresponds to the FIG. 2a embodiment and identical reference numbers are utilized to identify identical components. While one spring 120 is provided in the embodiment illustrated in FIG. 4, it should be appreciated that it could also include multiple springs.

In summary, numerous benefits result from employing a drive system 10, 100 as illustrated in this document. The drive system 10, 100 is relatively inexpensive to produce, is easy to package and requires very little space. The drive system 10, 100 has intrinsically low hysteresis or play (low backlash). Further, the driven element or door 26, D is always constrained. Since the drive shaft/pulley ratio is arbitrary, no transmission is necessary thereby lowering cost and weight. Advantageously, the drive system 10, 100 may be designed with the drive shaft 14, 106 much smaller in diameter than could be designed with any positive (sprocket or slip-free) drive belt, allowing much higher pulley ratios than other systems. Thus, a low power electric motor may be utilized to displace even relatively heavy driven elements or doors 26, D between two positions.

The foregoing has been presented for purposes of illustration and description. It is not intended to be exhaustive or to limit the embodiments to the precise form disclosed. Obvious modifications and variations are possible in light of the above teachings. While a door is illustrated as the driven element in FIGS. 2, 2*a*, 2*b*, 3, 3*a* and 4, it should be appreciated that the bi-directional element drive system 10 may also be utilized to drive other structures such as gates, arms, lock latches, levers, vehicle seats and even control surfaces of aircraft. It can be used to pivot a driven element 26 about an axis or translate a driven element along a track or other path. All such modifications and variations are within the scope of the appended claims when interpreted in accordance with the breadth to which they are fairly, legally and equitably entitled.

What is claimed:

1. A bi-directional element drive system, comprising:
    a motor including a drive shaft;
    a cable anchor centered on a pivot axis;
    a cable connector carried on said drive shaft and having two ends connected to said cable anchor, wherein one of the two ends is fixed to the cable anchor at a first point and the other one of the two ends is fixed to the cable anchor at a second point, wherein said cable connector is a single cable and said cable connector includes at least one spring to eliminate play;
    a support; and
    a driven element;
    whereby said driven element pivots about the axis along an arc between a first position and a second position relative to said support by said motor.

2. The system of claim 1, wherein said motor is fixed to said support and said cable anchor is fixed to said driven element.

3. The system of claim 1, wherein said motor is fixed to said driven element and said cable anchor is fixed to said support.

4. The system of claim 1, wherein said cable connector is also fixed to said drive shaft.

5. The system of claim 1, wherein said cable anchor is a fixed pulley.

6. The system of claim 1, wherein said driven element is selected from a group of structures consisting of a gate, a door, an arm, a lock latch and a lever.

7. A door system for a motor vehicle, comprising:
    a motor including a drive shaft;
    a cable anchor;
    a cable connector carried on said drive shaft and having two ends connected to said cable anchor, wherein one of the two ends is fixed to the cable anchor at a first point and the other one of the two ends is fixed to the cable anchor at a second point, wherein said cable connector is a single cable;
    an anchor point on a body of said motor vehicle; and
    a door received in a door opening on said body of said motor vehicle;
    whereby said door is displaced between an open position and a closed position along an arc by said motor.

8. The door system of claim 7, wherein said motor is fixed to said anchor point and said cable anchor is fixed to said door.

9. The door system of claim 8, wherein said motor is fixed to said door and said cable anchor is fixed to said anchor point.

10. The door system of claim 9, wherein said door pivots about a pivot axis between said open position and said closed position and said cable anchor is centered on said pivot axis.

11. The door system of claim 10, wherein said cable anchor is a fixed pulley and said anchor point is a door pillar of said vehicle.

* * * * *